United States Patent [19]

Stiling

[11] 4,101,630
[45] Jul. 18, 1978

[54] CONTINUOUS CALCINING OF GYPSUM

[75] Inventor: Rodney A. Stiling, Snyder, N.Y.

[73] Assignee: National Gypsum Company, Dallas, Tex.

[21] Appl. No.: 815,707

[22] Filed: Jul. 14, 1977

Related U.S. Application Data

[62] Division of Ser. No. 719,935, Sep. 2, 1976, Pat. No. 4,052,149.

[51] Int. Cl.² .............................................. C04B 11/02
[52] U.S. Cl. ..................................... 423/171; 423/172
[58] Field of Search ..................... 423/171, 172, 555; 432/14, 15, 58; 34/57 E; 106/109, 110

[56] References Cited

U.S. PATENT DOCUMENTS

| 2,647,738 | 8/1953 | Trainer | 432/58 |
| 2,911,730 | 11/1959 | Schaub et al. | 34/57 E |
| 3,956,456 | 5/1976 | Keller et al. | 423/171 |

Primary Examiner—O. R. Vertiz
Assistant Examiner—Wayne A. Langel

[57] ABSTRACT

A continuous calciner, particularly advantageous in converting gypsum to plaster, with two coaxial cylindrical walls, provides for heating air within the inner cylinder and then directing the air, for conveying and heating fine particles, along a spiral path, between the walls of the two coaxial cylinders, extending from one end of the calciner to an exit at the second end.

5 Claims, 2 Drawing Figures

CONTINUOUS CALCINING OF GYPSUM

This application is a division of copending application Ser. No. 719,935, filed Sept. 2, 1976 now U.S. Pat. No. 4,052,149, issued Oct. 4, 1977.

This invention relates to an apparatus for heating and conveying fine particulate material in a chamber between the walls of two coaxial cylinders while heating the conveying air within the inner cylinder, and particularly to the calcination of gypsum therein.

Calcination of gypsum, in its most common commercial form, involves heating gypsum, calcium sulfate dihydrate, and driving off some of the water of crystallization to form stucco, calcium sulfate hemihydrate. On subsequent addition of water to stucco, it will return to a rock-like calcium sulfate dihydrate. Although this basically is a very well known and ancient set of reactions, the stucco formed by calcination of gypsum can vary in its characteristics in many significant ways, depending on the method and apparatus employed. Several forms of heating devices have been used successfully to convert gypsum to stucco, such as large rotary kilns, kettles, and the multi-deck continuous calciner of Skinner et al., U.S. Pat. No. 2,788,960. Many other forms of heating devices have been tried resulting in producing very poor quality of useless calcined gypsum. Successful calcination normally requires the uniform removal of three-fourths of the combined water of substantially all of the gypsum being calcined. The presence of excess overburned or underburned material is one potential problem in calcining gypsum. Rehydration of the stucco with moisture formed by the calcination is another problem. Condensation followed by agglomeration of the solids on any elements of the calciner that are not kept suitably heated presents another problem.

It is an object of this invention to provide a novel apparatus for heating fine particulate material with a high degree of uniformity and efficiency.

It is a further object to provide an apparatus for improved manufacture of plaster from gypsum.

It is a still further object of the invention to provide a novel method of calcining gypsum.

These and other objects and advantages of the invention will be more readily apparent when considered in relation to the preferred embodiment of the invention as set forth in the specification and shown in the drawings in which.

Figures 1, 2:
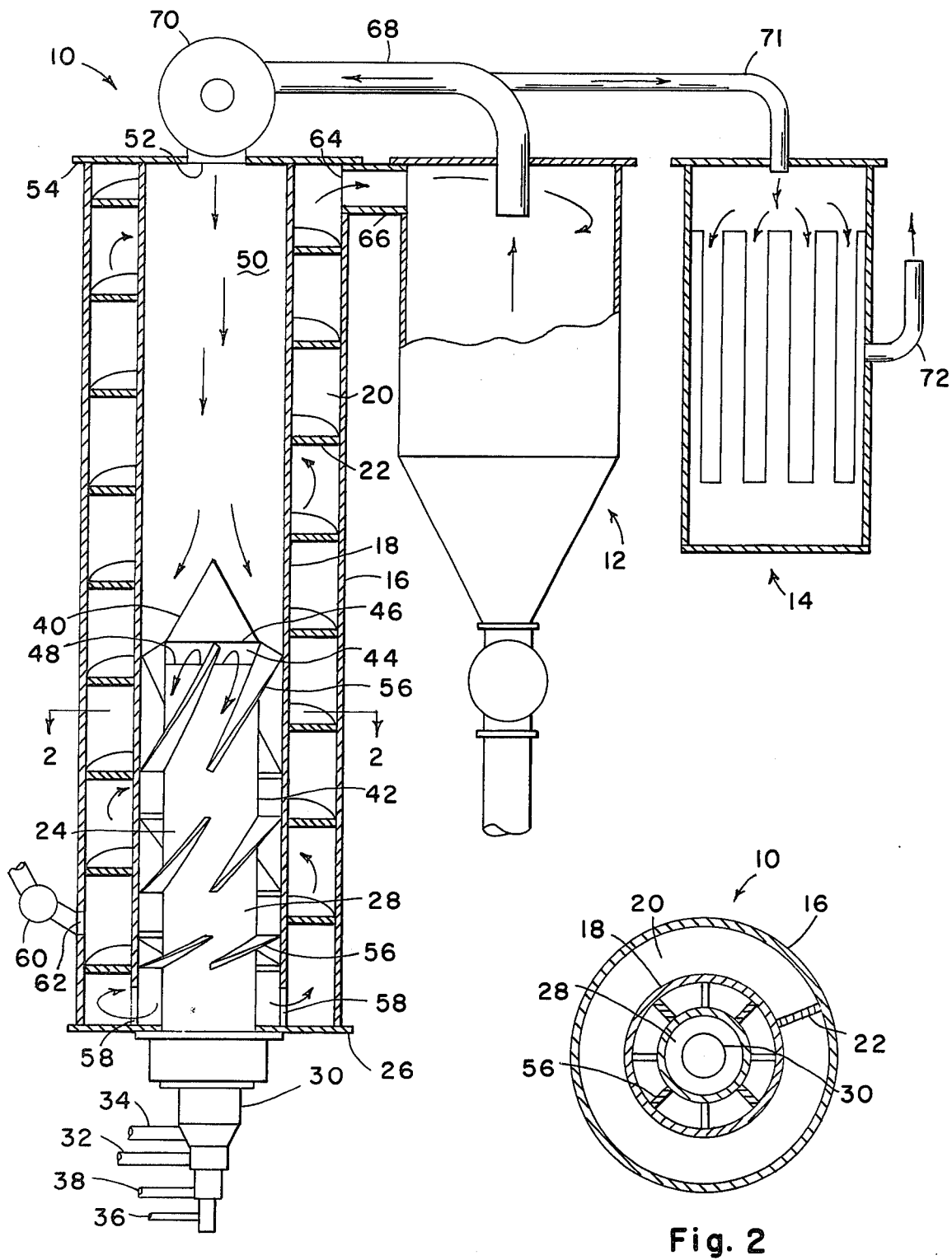
FIG. 1 is a vertical cross section, partially diagrammatic, of the apparatus of the present invention.
FIG. 2 is a horizontal cross section of the calciner of FIG. 1, taken on line 2—2.

Referring to the drawings, FIG. 1 includes a calciner 10, cyclone separator 12 and a dust bag collector 14 for recovering fines. The separator 12 and collector 14 are of standard construction providing the usual function of separating the solids from the gases.

The novel calciner 10 includes an outer cylindrical wall 16 and an inner coaxial cylindrical wall 18 which form between them the calcination zone 20. The calcination zone is divided into a plurality of spiralling levels by spiral plates 22 which function to guide material in a spiral path as it passes through the calcination zone 20.

Inside the lower portion of the inner cylindrical wall 18 is the heat source 24 of calciner 10. The heat source 24 extends through the calciner bottom wall 26 and consists of a cylindrical combustion chamber 28 with a oil burner 30 affixed at the bottom.

Burner 30 is of a standard commercial construction. Burner 30 is equipped with a pilot light gas inlet 32, a combustion air inlet 34, a fuel oil inlet 36 and an atomizing air inlet 38 for atomizing of the fuel oil. A gas burning pilot light is kept lit prior to starting the oil fire and throughout the burning of the oil by the burner 30, as is common with oil burners. The atomized fuel oil, thoroughly mixed with the combustion air is caused to ignite and burns thoroughly in the combustion chamber 28, in accordance with standard oil burner processes. Natural gas or other suitable fuels may be used for the primary fuel, if preferred.

Combustion chamber 28 has an upwardly pointing conical top deflector wall 40 having a base diameter equal to the diameter of the cylinder wall 42 of combustion chamber 28. An opening 44 is provided between the base 46 of deflector wall 40 and the top edge 48 of cylinder wall 42, which opening 44 extends substantially around the full circumference of the combustion chamber 28.

Inside the upper portion 50 of the inner cylindrical wall 18 there is particle conveying gas which has entered upper portion 50 through inlet 52 in a top wall 54. As will be discussed later, this particle conveying gas is a mixture of air, superheated steam and products of combustion being returned to the calciner after being separated from calcined material produced in a previous cycle.

Extending outward from the outer surfaces of combustion chamber wall 42 are spiral plates 56, which function to guide the gas in upper portion 50 in a spiral path as it passes from upper portion 50 to openings 58 in the bottom of inner cylindrical wall 18. As the gas from upper portion 50 moves downward, it is deflected radially outwardly by conical top deflector wall 40 and it mixes with the hot products of combustion exiting from the combustion chamber 28 through opening 44. The gas from upper portion 50 is also heated by the heat of the deflector wall 40 and the spiral plates 56.

The spiral plates 56 are arranged with plates 56 at progressively lower positions being at an increasing spiral angle. The mixture of the gas and the products of combustion are caused to move in a spiralling direction which is the same rotary direction as the upwardly spiralling caused by spiral plates 22 in the calcination zone 20.

Uncalcined gypsum is continuously fed, in a finely ground form, through feeder 60 and inlet 62. Inlet 62 is in the bottom portion of the outer cylindrical 16, and causes the uncalcined gypsum powder to be propelled by the moving hot gases and products of combustion that are moving from the openings 58 along the spiral paths upward through the calcination zone 20.

As the uncalcined gypsum is carried spirally upward through the calcination zone 20, it is also being very uniformly heated by the gases and products of combustion which convey it. At the top of the calcination zone 20, there are openings 64 in the outer cylinder 16 through which the fine gypsum, gases and products of combustion exit from the calcination zone 20, and enter a duct 66.

Duct 66 conveys material from openings 64 to the separator 12. Separator 12 is a cyclone collector which separates the solids, except for fine dust, from the gaseous conveying medium. These dust laden gases are then returned by duct 68 through high volume blower 70 to inlet 52, from where the cycle repeats itself. A portion of the returning gases are directed to a bag dust collector 14, through pipe 71, where the fine dust is removed and the clean gases and the water released from the gypsum are vented through outlet 72 to the atmosphere, to balance the volume of gases added as products of combustion and as water of hydration in the gypsum.

Although the calciner 10 may be used to calcine or dry other fine solids also, it has proven highly advantageous in calcining finely ground gypsum, which is calcium sulfate dihydrate ($CaSO_4.2H_2O$). In the embodiment disclosed, a gypsum powder of about 90% through a U.S. Standard Sieve Size No. 100 is supplied continuously to a controllably fixed speed feeder 60.

To produce two thousand pounds (907 kg) of calcined gypsum (calcium sulfate hemihydrate) per hour, uncalcined gypsum of 90% purity was fed to the inlet 62 at a uniform rate equal to about two thousand three hundred forty pounds (1060 kg) per hour.

Recycled gases enter upper portion 50 at a rate of about 1500 cubic feet per minute (43 cu m/min) and at a temperature of about 340° F (170° C). These gases are deflected radially outward by deflector wall 40 as they move downward. As these gases pass opening 44, they mix with the products of combustion which are exiting from the combustion chamber 28 through openings 44. These products of combustion may be as much as about 4000° F (about 2000° C).

The mixture of the two, recycled gases and gases which are the immediate product of combustion, moves downward between combustion chamber wall 42 and inner cylinder and inner cylindrical wall 18. As this gas mixture moves down, spiral plates 56 change the movement of the gases from straight downwardly to spirally downwardly, increasing the angle of spiral gradually as it progresses downwardly. Spiral plates 56 also conduct heat from combustion chamber wall 42, to where the downwardly moving gases are able to be further heated by the plates 56, as well as the wall 42.

Looking downward, the downwardly moving gases are caused to move in a clockwise spiral. As these gases reach the bottom, they move radially outward through openings 58 while continuing the clockwise rotary motion. After passing through openings 58, the gases start a clockwise spiral motion upwardly through calcination zone 20, taking with them the uncalcined gypsum being fed thereinto at inlet 62.

As the gases pass through openings 58, the temperature of the gases is constantly monitored. A preferred temperature of gases at openings 58, for the calcination of gypsum, is about 870° F (465° C). These 870° F gases transfer a substantial portion of their heat to the 2340 pounds (1063 kg) of uncalcined gypsum being fed to the calcination zone, per hour.

Although not shown, it will be understood that all of the exterior surfaces of calciner 10, separator 12, bag collector 14, and ducts therebetween are covered with insulation to eliminate as much loss of heat from the process as is reasonably possible.

To raise the heat of the 1500 cubic feet per minute incoming gases from 340° F to 870° F there is required 650,000 BTU/hr. The combination of this 1500 cubic per minute of recycled gases with the products of combustion, at the 870° F converts the 2340 pounds of uncalcined gypsum of 90% purity to completely calcined calcium sulfate hemihydrate, $CaSO_4.\frac{1}{2}H_2O$, with no measurable overburned or underburned material present, which is most unusual in the production of the hemihydrate.

The 870° F starting temperature for the calcination process is controlled by control of the rate of oil fed to the burner, 30. The 340° F final temperature of the gases, returning through inlet 52 after completing a cycle, is controlled by varying the rate of feed of uncalcined gypsum at inlet 62. If the returning gases increase in temperature, the product feed through inlet 62 is increased in order to bring the returning gas temperature back down to the desired reading.

The very compact arrangement of combustion chamber within the calcination zone results in a most economical process.

Having completed a detailed disclosure of a preferred embodiment of my invention so that those skilled in the art may practice the same, I contemplate that variations may be made without departing from the essence of the invention.

I claim:

1. The method of calcining calcium sulfate dihydrate of a fineness of about 90% through 100 mesh to form a calcium sulfate hemihydrate comprising the steps of conducting recycled gases downwardly around the outer surface of a combustion chamber, heating additional gases within said combustion chamber, combining said additional gases with said recycled gases, guiding said combination of gases to a spiral calcination zone which is disposed radially outward of said combustion chamber, combining and uniformly mixing said calcium sulfate dihydrate with said combination of gases as said combination of gases starts to flow spirally upwardly through said calcination zone, maintaining said uniform mixture in combination as said combination flows through said calcination zone, uniformly transferring heat from said heated gases to all of said calcium sulfate dihydrate, removing said combination of gases and solids therein at the top of said calcination zone, separating the calcined solids from said gases, and recycling said gases to the outer surface of said combustion chamber for use in another calcining cycle.

2. The method of claim 1 wherein said calcium sulfate dihydrate is fed to said combination of gases while said gases are at a temperature of about 870° F.

3. The method of claim 2 wherein said calcium sulfate dihydrate is fed to said combination of gases at a rate which is controlled by the temperature of the gases measured at a point in the process after completion of the calcination.

4. The method of claim 3 wherein said gases after calcination are at a temperature of about 340° F.

5. The method of claim 1 wherein said combustion chamber has outwardly extending spirally extending plates and wherein said recycled gases are heated by said plates and are directed toward a spiral path by said plates.

* * * * *